May 3, 1927.
R. LA FRANCE
CONVEYING APPARATUS
Original Filed April 22, 1924     3 Sheets-Sheet 1
1,626,738
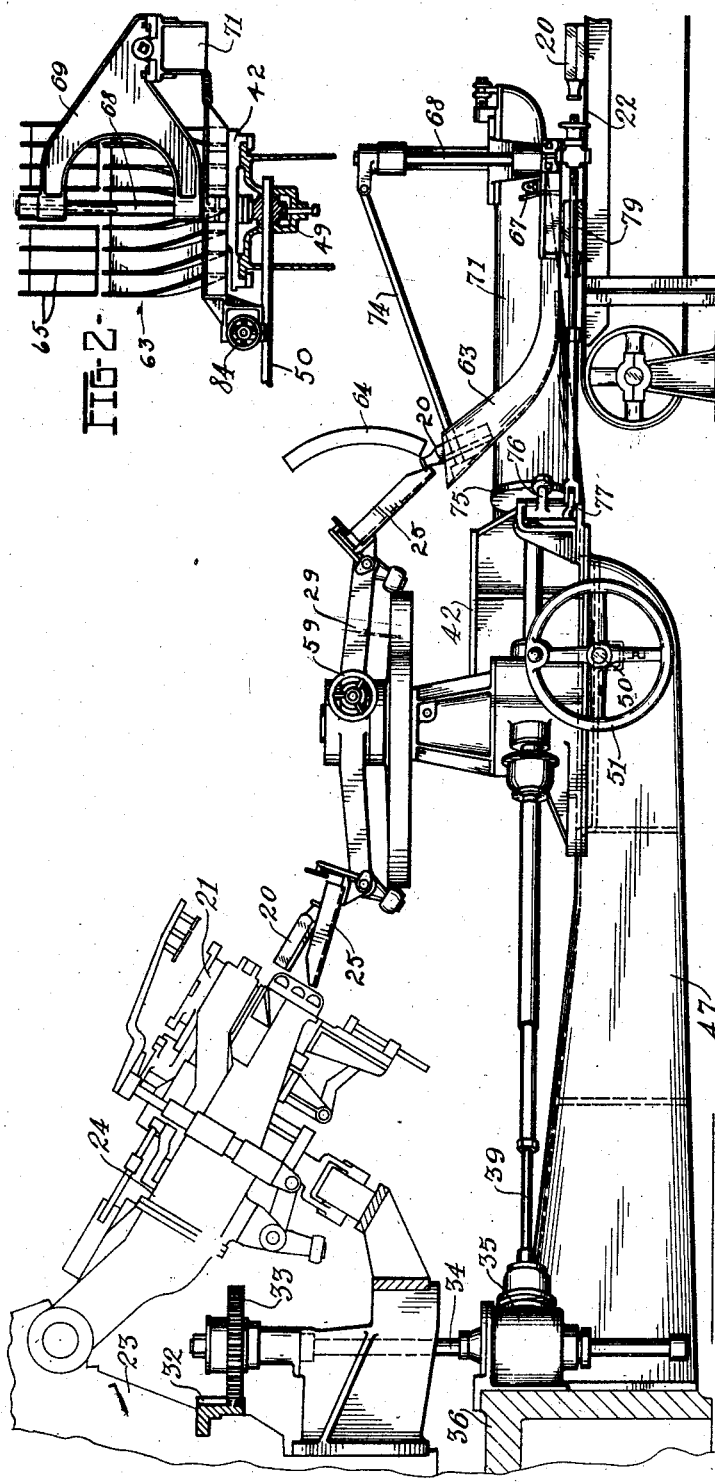
INVENTOR
Richard La France
By J. F. Rule
His attorney.

May 3, 1927.
R. LA FRANCE
CONVEYING APPARATUS
Original Filed April 22, 1924     3 Sheets-Sheet 2
1,626,738
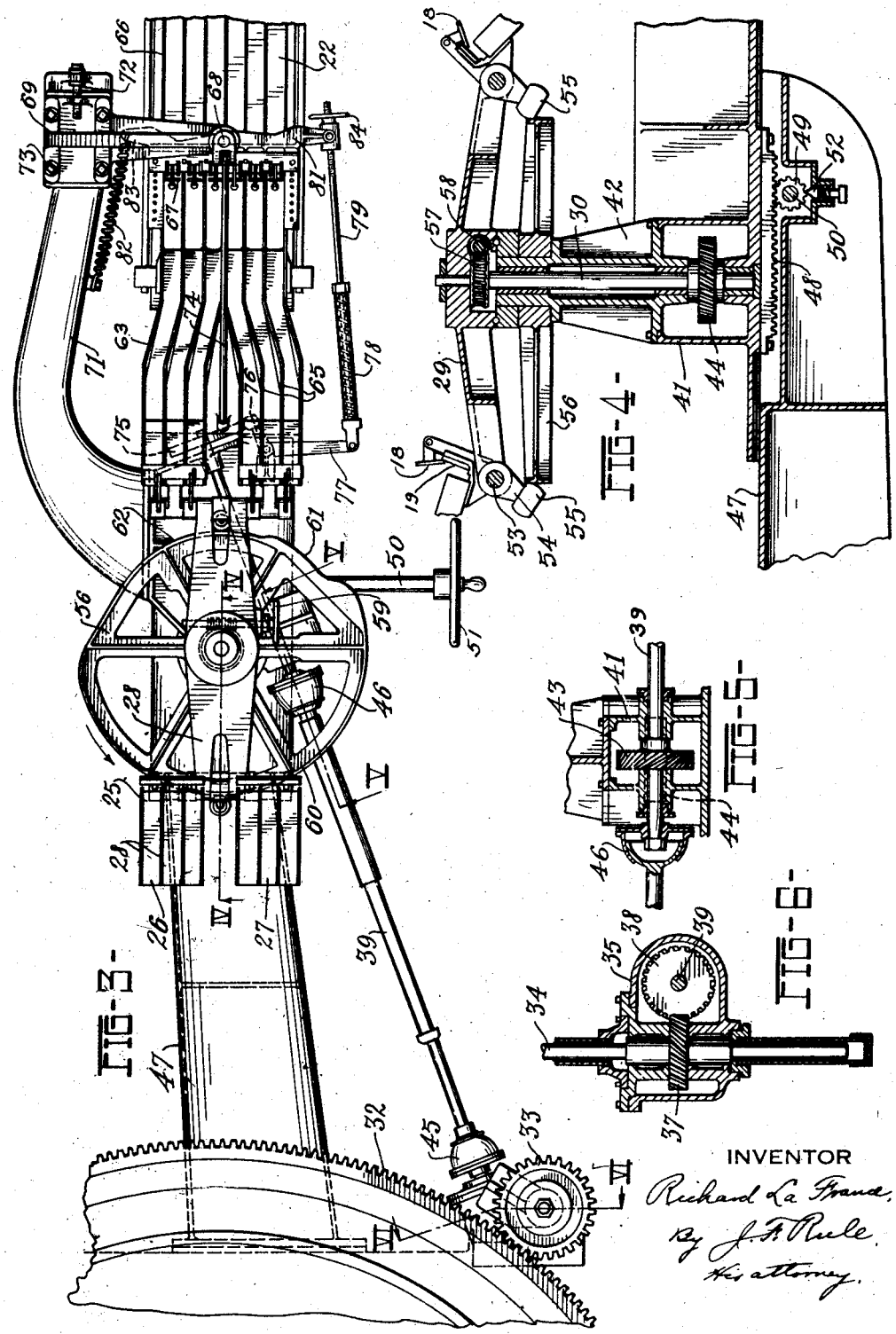
INVENTOR
Richard La France,
By J. F. Rule
His attorney.

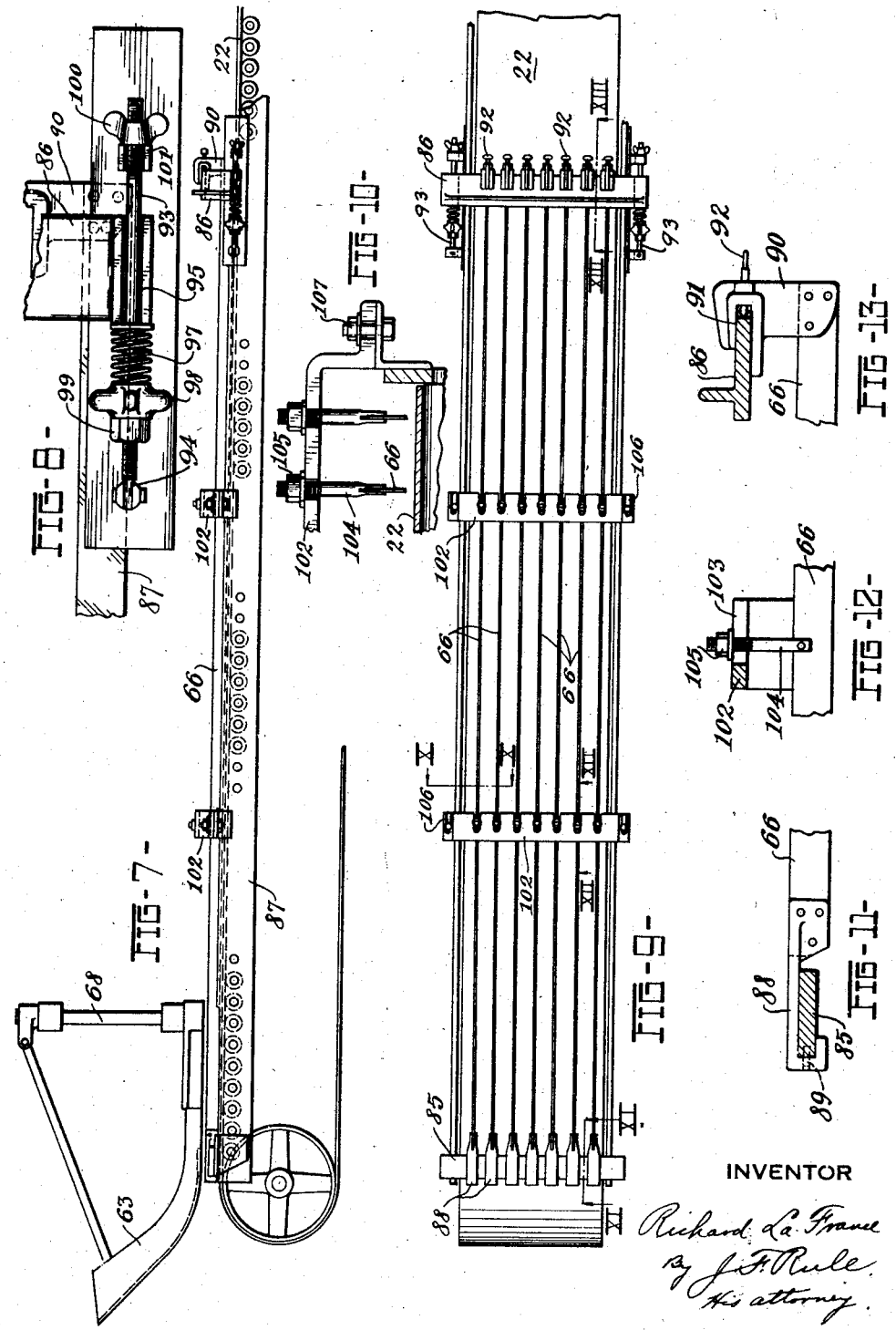

Patented May 3, 1927.

1,626,738

UNITED STATES PATENT OFFICE.

RICHARD LA FRANCE, OF TOLEDO, OHIO, ASSIGNOR TO THE OWENS BOTTLE COMPANY, OF TOLEDO, OHIO, A CORPORATION OF OHIO.

CONVEYING APPARATUS.

Application filed April 22, 1924, Serial No. 708,171. Renewed February 7, 1927.

My invention relates to apparatus designed for receiving bottles, jars or other glass articles as they are discharged from a forming machine and carrying them away from the machine. The apparatus may be used to transfer the articles to a conveyor by which they are carried to an annealing leer. In the particular form of the invention herein illustrated, the apparatus is designed for receiving and transferring a plurality of such articles at a time, which articles are delivered from the forming machine in multiples or groups. Such articles when they are discharged from the molds of a forming machine are soft and plastic and must be handled with care to prevent them from being marred or distorted. Also, if the articles are permitted to come in contact with each other while in such hot, soft condition, there is a tendency for them to stick together.

An object of the present invention is to provide practical apparatus for receiving the bottles or other articles as discharged from the molds, keeping them separated and handling them in a manner to prevent marring or distortion until they have cooled and hardened.

Other objects of the invention will appear hereinafter.

In the accompanying drawings:

Figure 1 is a side elevation of apparatus constructed in accordance with my invention.

Figure 2 is a part sectional end elevation of the same.

Figure 3 is a plan view of the apparatus.

Figures 4, 5 and 6 are sectional elevations at the lines IV—IV, V—V and VI—VI, respectively, on Figure 3.

Figure 7 is an elevation of the conveyor and guiding strips thereover.

Figure 8 is a detail side elevation on a larger scale showing a tensioning device for the guiding strips shown in Figure 7.

Figure 9 is a plan of the apparatus shown in Figure 7.

Figures 10, 11, 12 and 13 are sectional elevations at the lines X—X, XI—XI, XII—XII and XIII—XIII, respectively, on Figure 9.

Referring particularly to Figures 1 to 6 inclusive, the apparatus herein shown is designed for receiving bottles 20 or other glass articles as they are delivered from a forming machine 21 and transferring them to an endless conveyor 22 by which they are carried to the leer. The machine 21 herein shown is of the Owens type and comprises a mold carriage 23 rotating continuously about the central vertical axis of the machine. Mold carrying frames 24 on the carriage operate in succession as they reach the discharging position (Fig. 1), to discharge the bottles 20. The molds on each frame discharge their bottles either simultaneously or in quick succession.

The apparatus for receiving these bottles as herein shown is designed to receive six at a time, although the number obviously may be varied. The bottles as they are discharged from the molds of the blowing machine drop on to carriers 25, each of which comprises a pair of platforms 26 and 27. These platforms are divided into individual compartments by spacing strips or partitions 28 to receive the individual bottles and prevent them from coming in contact with each other before they have cooled sufficiently to prevent sticking. Asbestos strips 19 are removably held in place on the carriers by pivoted weights 18 and serve as buffers for the bottles. As herein shown, two carriers 25 are provided, the same being supported at opposite ends of a horizontally disposed arm or carriage 29 mounted on a vertical drive shaft 30 for continuous rotation therewith.

The means for driving the shaft 30 comprises a ring gear 32 on the machine carriage 23, which gear drives a pinion 33 on a vertical shaft 34. Said shaft extends downward through a gear case 35 mounted on the base 36 of the blowing machine. Within the gear case is a gear 37 (Fig. 6) which drives a gear 38 within the gear case. The gear 38 is mounted on a horizontally disposed shaft 39. The shaft 39 extends forward through a casing 41 which forms part of an adjustable frame 42 in which the vertical shaft 30 is mounted. Within the casing 41 is a gear 43 on the shaft 39 which gear meshes with a gear 44 on the shaft 30. The shaft 39 includes universal joints 45 and 46 and telescoping sections between said joints to permit adjustment of the frame 42 toward and from the bottle blowing machine. The frame 42 is supported on the outer end of an arm 47 secured to the machine base 36. The frame 42 is adjustable by means of a rack 48 (Fig. 4) secured to the under side thereof and operated by a pinion 49 on a shaft 50 mounted in the arm 47. A hand wheel 51 is attached to the shaft 50 for rotating it to adjust the frame 42 toward or from the blowing machine for bringing the carriers 25 into proper position with respect to the molds. A spring detent 52 (Fig. 4) holds the pinion in its adjusted position.

The carriers 25 are mounted for tilting movement on the arm 29. To permit such movement of a carrier, a rock shaft 53 is journaled in the end of the arm 29 and the platforms 26 and 27 are fixed to said rock shaft at opposite sides of the arm. The latter is bifurcated to receive a rock arm 54 fixed to the shaft 53 and carrying a cam engaging roll 55 which runs on a stationary cam 56 to control the tilting movements of the carrier. The arm 29 on which the carriers are mounted has an adjustable connection with the continuously rotating shaft 30, comprising a worm gear 57 fixed to said shaft and meshing with a worm on a shaft 58 journalled in the arm 29 and provided with a hand wheel 59. By rotating the hand wheel, the arm 29 is rotatively adjusted on the shaft 30 and the carriers 25 thereby adjusted horizontally to the position required to insure the bottles being dropped in proper position on the platforms. It will be understood that the gearing for driving the carriers is so proportioned that one of the carriers is brought into register with each head 24 as the latter reaches its discharging position.

The cam 56 comprises a dwell portion 60 by which each carrier 25 is held in an upwardly and outwardly inclined position to receive the bottles. As the carrier travels toward discharging position, the cam roll 55 is brought to an intermediate section 61 of the cam which permits the carrier to swing downwardly to an approximately horizontal position. When the section 62 of the cam is reached, the carrier swings downward so that the bottles are permitted to slide by gravity therefrom onto an inclined chute 63. A stationary shield 64 may be provided and arranged to prevent a premature discharge of the bottles from the carrier.

The bottles slide down the chute 63 and drop off the forward end of the chute onto the horizontal conveyor 22. The chute 63 is provided with guiding strips 65 which divide it into individual chutes or channels for the bottles whereby they are kept out of contact with each other and are guided into position between guide strips 66 extending lengthwise over the conveyor 22. The guide strips 65 on the chute are extended beyond the floor of the chute so that the bottles are held in parallel spaced relation as they drop from the chute onto the conveyor and pass between the guide strips 66. Stops 67 are provided at the outer ends of the chute 63 to arrest the forward movement of the bottles as they drop from the chute.

The chute 63 is mounted to oscillate about the axis of a vertical shaft 68 supported in a bracket 69 mounted on the forward end of an arm 71 attached to the frame 42. The bracket 69 is adjustable lengthwise of the arm 71 by means of an adjusting screw 72 and is held in adjusted position by bolts 73. A brace rod 74 extends from the upper end of the shaft 68 to the inner end of the chute 63. The chute is oscillated by means of a cam 75 on the forward end of the shaft 39. Said cam operates a rock arm 76 connected through a vertical shaft to a rock arm 77. The latter is connected through a spring buffer 78 and rod 79 to an arm 81 fixed to the shaft 68. The arm 76 is held to its cam 75 by a spring 82 connected to an arm 83 on the shaft 68. The cam 75 is so shaped that it will cause the receiving end of the chute 63 to advance with the discharging carrier 25 through a limited distance sufficient to retain the chute in register with the traveling carrier while the bottles slide from the carrier onto the chute. The chute then returns to register with the next carrier. The rod 79 is adjustable lengthwise relatively to the arm 81 by means of an adjusting wheel 84 threaded on said rod, whereby the chute 63 may be adjusted transversely into position to accurately register with the carriers 25 while the latter are discharging.

Referring particularly to Figures 7 to 13 inclusive, the guiding strips or ribbons 66 are mounted over the conveyor 22 and are of sufficient length to keep the bottles separated during their travel through a considerable distance, so that sufficient cooling and hardening of the bottles is insured before they pass beyond said strips. The strips 66 are preferably made of thin sheet metal, but may be of other material, and are anchored at their opposite ends respectively to transverse supporting bars 85 and 86 mounted on the frame 87 of the conveyor. Each strip 66 is provided at one end with a hook 88 to engage the bar 85. Pins 89 in the hooks 88 enter corresponding holes in the bar 85 to hold the strips 66 properly spaced along said bar. Each strip 66 at its opposite end has secured thereto a head 90 provided with a slot 91 to receive the bar 86. An adjusting screw 92 mounted in said head provides a means for adjusting the tension of the strip.

The bar 86 is connected to the conveyor frame by means of rods 93 (Figs. 8 and 9). Each rod has a pivotal connection 94 with the frame and extends forward across the end of the bar 86. The latter is formed with a groove 95 to receive the rod. A tension spring 97 is interposed between the bar 86 and an adjusting nut 98 threaded on the rod. A lock nut 99 holds the nut 98 in adjusted position. By adjusting the nuts 98 at opposite ends of the bar 86, the tension on the spacing strips 66 may be adjusted. The outer ends of the rods seat in bearing lugs 101, and thumb nuts 100 serve to clamp the rods in position. By loosening said nuts, the rods can be swung out of engagement with the lugs 101 and bar 86 for disassembling the parts.

At intermediate positions along the strips 66, bridges 102 extend across the conveyor over said strips. Each bridge is provided with slots 103 spaced to correspond with the spacing of the strips 66, to receive screw rods 104 attached to the strips. Adjusting nuts 105 permit the strips to be individually adjusted vertically. Each of the bridge bars 102 is formed at its ends with slots 106 to receive clamping bolts 107, this construction permitting adjustment of said bars lengthwise of the conveyor.

Modifications may be resorted to within the spirit and scope of my invention.

What I claim is:

1. The combination with a glass forming machine comprising a rotating mold carriage and molds thereon operative to discharge glass articles in groups, of a conveyor, an apparatus for transferring the articles from the machine to the conveyor, said apparatus comprising a carrier having a plurality of compartments for receiving the articles as they are discharged from the molds, a support on which said carrier is mounted for tilting movement, a vertical drive shaft to which said support is connected, driving mechanism extending from the mold carriage to said drive shaft for rotating the latter and causing the carrier to revolve about the axis of said shaft and thereby be brought periodically into said article receiving position, a stationary cam controlling the tilting movements of said carrier, an inclined chute at the side of said shaft remote from the mold carriage, said chute comprising spacing members dividing it into individual runways so positioned that the sections of the carrier are brought into alignment with the respective runways as the carrier rotates, said cam being formed to permit a downward tilting of the carrier when in line with the chute, whereby the articles are permitted to slide by gravity from the carrier onto and down the chute, and automatic means to oscillate the chute horizontally and cause it to move for a limited distance with the carrier while in alignment therewith.

2. The combination of a glass forming machine comprising a rotating mold carriage and molds thereon adapted to discharge articles in groups during the rotation of the carriage, a conveyor, and means to transfer the articles to the conveyor comprising a carrier having a plurality of compartments, automatic means for actuating said carrier in synchronism with the movements of the mold carriage, and thereby periodically bringing the carrier into register with the molds to receive the articles as they are discharged from the molds, and causing the carrier to travel in register with the molds while the articles are transferred from the molds to the carrier, the carrier being then moved to position to discharge the articles and deliver them to the conveyor.

3. The combination of a machine for forming glass articles comprising a mold carriage, molds thereon operable to discharge articles during the travel of the molds, transfer mechanism comprising a carrier, automatic means to move said carrier and cause it to travel in register with the molds during the discharge of said articles and then move away from the mold carriage, and mechanism to actuate said carrier to discharge the articles therefrom.

4. The combination of a machine for forming glass articles comprising a mold carriage, molds thereon operable to discharge articles during the travel of the molds, transfer mechanism comprising a carrier, automatic means to move said carrier and cause it to travel in register with the molds during the discharge of said articles and then move away from the mold carriage, mechanism to actuate said carrier to discharge the articles therefrom, said actuating mechanism comprising a stationary cam, and means operated thereby to tilt the carrier from an article receiving to a discharging position.

5. The combination of a machine for forming glass articles comprising a mold carriage molds thereon operable to discharge articles during the travel of the molds, transfer mechanism comprising a carrier, and automatic means to move said carrier and cause it to travel in register with the molds during the discharge of said articles and then move away from the mold carriage, said carrier comprising a plurality of individual compartments to receive the articles and hold them out of contact with each other.

6. The combination of a machine for forming glass articles comprising a mold carriage, molds thereon operable to discharge articles during the travel of the molds, transfer mechanism comprising a carrier, automatic means to move said carrier and cause it to travel in register with the molds during the discharge of said articles and then move away from the mold carriage, said carrier comprising a plurality of individual compartments to receive the articles and hold them out of contact with each other, mechanism to actuate said carrier to discharge the articles therefrom, said actuating mechanism comprising a stationary cam, and means operated thereby to tilt the carrier from an article receiving to a discharging position.

7. The combination of a glass forming machine comprising a rotating mold carriage and molds thereon, transfer mechanism comprising a drive shaft, a supporting member connected thereto for rotation therewith, a carrier connected to said supporting member and moved thereby into position to register with the molds and travel therewith to receive articles as they are discharged from the traveling molds, and adjusting means for adjusting said supporting member rotatively about the drive shaft.

8. The combination of a glass forming machine comprising a rotating mold carriage and molds thereon, transfer mechanism comprising a drive shaft, a supporting member connected thereto for rotation therewith, a carrier connected to said supporting member and moved thereby into position to receive articles as they are discharged from the molds, and adjusting means for adjusting said supporting member rotatively about the drive shaft, said adjusting means comprising a worm gear on the drive shaft, a worm shaft journalled in said supporting member, a worm on the worm shaft meshing with the worm gear, and a hand wheel on the worm shaft.

9. The combination of a machine for forming glass articles, a carrier to receive the articles as they are discharged from said machine, driving mechanism extending from the machine to said carrier for causing the latter to travel and thereby carry the articles away from the machine, means to actuate said carrier for discharging the articles therefrom, a device for receiving the articles as they are discharged from the carrier, and means for causing said device to periodically move with the carrier while the articles are being discharged from the carrier.

10. The combination of a mold carriage, a drive shaft, an article carrier having a driving connection with the drive shaft for causing it to travel about the axis of the drive shaft, a horizontally disposed power transmitting shaft forming a connection between the mold carriage and said drive shaft, means to actuate said carrier to discharge the articles therefrom, a receiving device to receive the articles as they are discharged from said carrier, a cam on said power transmitting shaft, and connections between said cam and receiving device for oscillating the latter and causing it to travel with the carrier during the transfer of articles from the carrier to said receiving device.

Signed at Toledo, in the county of Lucas and State of Ohio, this 16th day of April, 1924.

RICHARD LA FRANCE.